United States Patent
Eklund et al.

(10) Patent No.: US 7,346,041 B2
(45) Date of Patent: Mar. 18, 2008

(54) PROCESSING OF AN OFDM SIGNAL

(75) Inventors: Carl Eklund, Helsinki (FI); Lars Lindh, Helsinki (FI)

(73) Assignee: Nokia Corporation, Espoo (FI)

( * ) Notice: Subject to any disclaimer, the term of this patent is extended or adjusted under 35 U.S.C. 154(b) by 358 days.

(21) Appl. No.: 11/007,237

(22) Filed: Dec. 9, 2004

(65) Prior Publication Data

US 2006/0126764 A1 Jun. 15, 2006

Related U.S. Application Data

(63) Continuation of application No. PCT/FI02/00549, filed on Jun. 20, 2002.

(51) Int. Cl.
*H04J 1/00* (2006.01)

(52) U.S. Cl. ............... 370/343; 370/344; 375/260; 375/261; 375/285; 375/296

(58) Field of Classification Search ........... 370/343, 370/344; 375/260–261, 285, 296
See application file for complete search history.

(56) References Cited

U.S. PATENT DOCUMENTS 7,088,782 B2 * 8/2006 Mody et al. ............... 375/260

FOREIGN PATENT DOCUMENTS

EP 1 139 625 A2 10/2001

OTHER PUBLICATIONS

Hill G. et al.; "*Cyclic Shifting And Time Inversion Of Partial Transmit Sequences To Reduce The Peak-To-Average Power Ratio In OFDM*", IEEE, Sep. 18-21, 2000, pp. 1256-1259.
Müller, S. et al.; "*A Comparison Of Peak Power Reduction Schemes For OFDM*", IEEE 1997, pp. 1-5.
Zekri, M. et al.; "*Peak-To-Average Power Reduction For Multicarrier*", IEEE ICT 2001, Jun. 4-7, 2001, pp. 1-4.

* cited by examiner

*Primary Examiner*—Matthew Anderson
*Assistant Examiner*—Angelica M. Perez
(74) *Attorney, Agent, or Firm*—Squire, Sanders & Dempsey, LLP

(57) ABSTRACT

The invention relates to an OFDM-transmitter, comprising means for transforming (400) data to be transmitted in frequency-to-time transformation to a basic waveform containing waveform components representing subbands of the spectrum of the signal. The transmitter comprises means for forming (402) at least one alternative waveform from components of the basic waveform, where at least one component in the alternative waveform is delayed in time, and means for selecting (414) a waveform for transmission from the group of waveforms, containing the basic waveform and the at least one alternative waveform. The invention also relates to a method for transmitting an OFDM signal, a method for processing an OFDM signal and an OFDM signal processing arrangement.

39 Claims, 3 Drawing Sheets

PROCESSING OF AN OFDM SIGNAL

Figure 1:
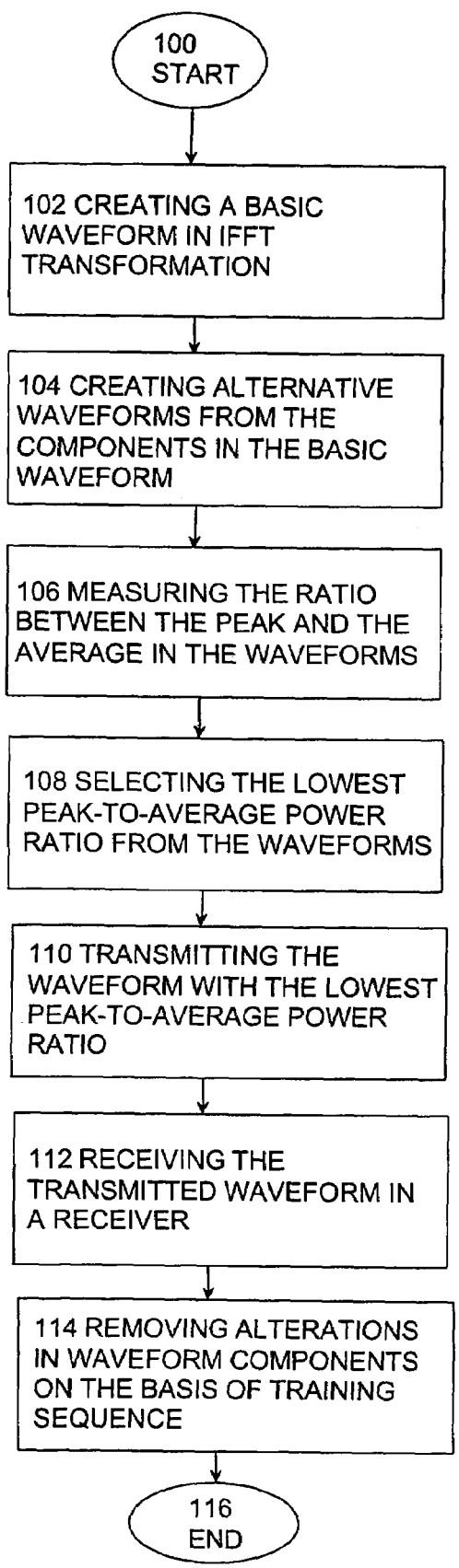

This is a Continuation of International Application No. PCT/FI2002/000549 filed Jun. 20, 2002, which designated the U.S. and was published under PCT Article 21(2) in English.

FIELD

The invention relates to a communication system using OFDM (Orthogonal Frequency Division Multiplexing) modulation.

BACKGROUND

Orthogonal frequency division multiplexing (OFMD) is a technique where the channel is divided into a high number of parallel subcarriers which are transmitted simultaneously. Each subcarrier can be modulated by data, such as voice or text. The OFDM can be applied both in fixed and in wireless communications networks.

One of the most difficult problems in OFDM transmission is handling of large peak-to-average power ratios. A peak occurs in the signal power when data sent along different carriers align themselves in phase. In order to handle the peak in power, the power amplifier in the transmitter will provide gain for every peak. This is especially disadvantageous for instance in respect of the design of mobile terminals, because it is costly to provide terminals with power amplifiers with high power levels. Use of high power levels also shortens battery life. One solution to cope with this is that OFDM transmitters utilize clipping where the power peaks are clipped to a certain lower power level.

Clipping introduces distortion into the signal, and probability for bit-error decisions thus increases.

SUMMARY

The object of the invention is to provide an OFDM transmitter, which provides a better peak-to-average ratio.

This is achieved with a method of transmitting an OFDM signal, comprising transforming in frequency-to-time transformation data to be transmitted to a basic waveform containing a first set of waveform components representing subbands of the spectrum of the signal. The method further comprises forming at least one alternative waveform comprising a second set of waveform components, where the second set of waveform components is formed using waveform components in said first set of waveform components of the basic waveform, and where at least one waveform component in the second set of waveform components is delayed in time compared to the corresponding waveform component in the first set of waveform components, and selecting a waveform for transmission from the group of waveforms, where the group contains the basic waveform and said at least one alternative waveform.

The invention is also related to a method of processing an OFDM signal, which OFDM signal transmission is performed in bursts, and where each burst comprises at least one training symbol and at least one data symbol, the method comprising transforming in frequency-to-time transformation data to be transmitted to a basic waveform containing waveform components representing subbands of the spectrum of the OFDM signal. The method further comprises forming at least one alternative waveform comprising a second set of waveform components, where the second set of waveform components is formed using waveform components in said first set of waveform components of the basic waveform, and where at least one waveform component in the second set of waveform components is delayed in time compared to the corresponding waveform component in the first set of waveform components, selecting a waveform for transmission from the group of waveforms, where the group contains the basic waveform and the at least one alternative waveform, transmitting the OFDM signal containing the selected waveform, receiving the transmitted OFDM signal in a receiver; and removing in the receiver alterations in waveform components in the received OFDM signal compared with the transmitted OFDM signal with the aid of said at least one training symbols.

The invention is also related to an OFDM transmitter, comprising means for transforming data to be transmitted in frequency-to-time transformation to a basic waveform containing waveform components representing subbands of the spectrum of the signal. The transmitter comprises means for forming at least one alternative waveform comprising a second set of waveform components, where the second set of waveform components is formed using waveform components in said first set of waveform components of the basic waveform, and where at least one waveform component in the second set of waveform components is delayed in time compared to the corresponding waveform component in the first set of waveform components, and means for selecting a waveform for transmission from the group of waveforms, containing the basic waveform and the at least one alternative waveform.

The invention also relates to an OFDM signal processing arrangement, comprising a transmitter for transmitting an OFDM signal, which OFDM transmission is performed in bursts, where each burst comprises at least one training symbol and at least one data symbol, the arrangement further comprising a receiver for receiving the transmitted OFDM signal, the transmitter comprising means for transforming data to be transmitted in frequency-to-time transformation to a basic waveform containing waveform components representing subbands of the spectrum of the OFDM signal. The transmitter comprises means for forming at least one alternative waveform comprising a second set of waveform components, where the second set of waveform components is formed using waveform components in said first set of waveform components of the basic waveform, and where at least one waveform component in the second set of waveform components is delayed in time compared to the corresponding waveform component in the first set of waveform components, means for selecting a waveform for transmission from the group of waveforms, where the group contains the basic waveform and the at least one alternative waveform, and means for transmitting the OFDM signal containing the selected waveform, and the receiver comprises means for receiving the transmitted OFDM signal and means for removing in the receiver alterations in waveform components in the received OFDM signal compared with the transmitted OFDM signal with the aid of said at least one training symbols.

The invention thus provides a method and an apparatus for OFDM signal processing. In the OFDM transmitter the data to be sent is transformed in IFFT (Inverse Fast Fourier Transform) transformation to a basic waveform, which contains waveform components corresponding to different subbands in an OFDM signal. The waveform component is thus part of the basic waveform, which corresponds to part of the spectrum of the basic waveform, and the sum of these waveform components forms the basic waveform. In the invention, at least one alternative waveform is created using waveform components in the basic waveform. The alternative waveform is formed so that at least one of the waveform components forming the basic waveform is delayed in time. The delay can be for example one or two samples. In the invention, the basic waveform and the formed at least one alternative waveform are compared to each other, and one is selected for transmission. The selection can be based for instance on the peak-to-average ratio in the baseband signals, where the waveform with the lowest peak-to-average ratio is selected for transmission. The peak-to-average ratio can be measured, and the selection of the waveform to be sent can be performed from the duration of an OFDM burst. The created alternative waveforms can be stored in the memory until the one to be sent has been found in the set of waveforms. The invention can be implemented for instance in terminal equipment using a mobile communication system.

The invention provides a way to lower the most critical quality factor in OFDM transmission, that is, the peak-to-average power ratio. For instance, in a 256-subcarrier simulation the invention reduces the PAPR by about 2.5 dB. The invention also provides advantages in dimensioning power amplifiers in OFDM transmitters. This is especially advantageous for instance in mobile terminals, where savings in power amplifiers can be substantial for the design of terminals. Usage of lower power levels also lengthens the battery life in mobile terminals.

DRAWINGS

Figure 2:
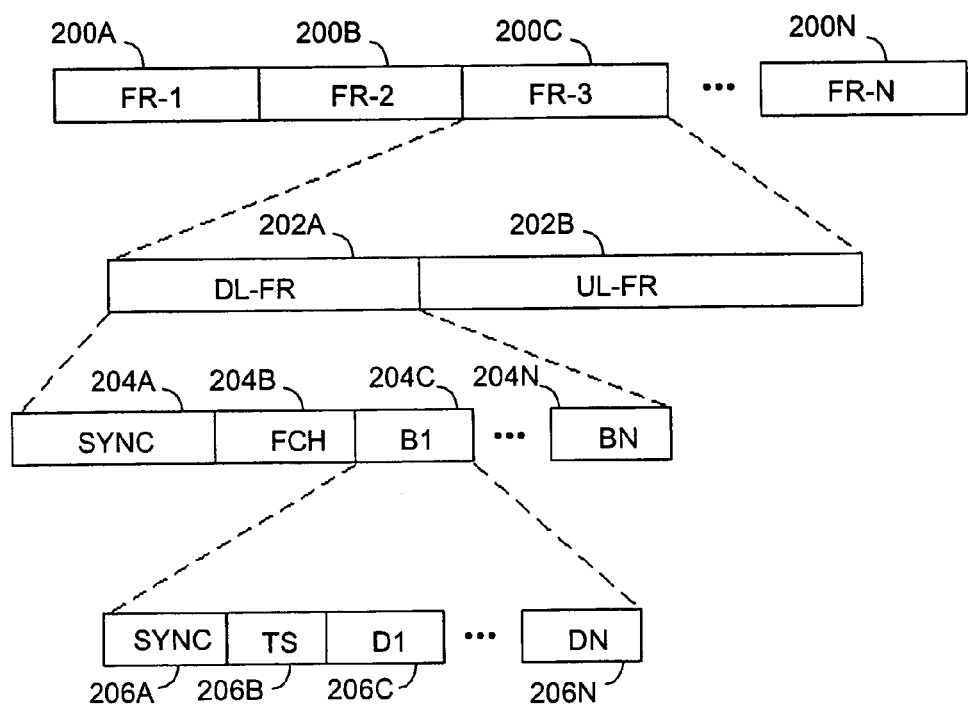
Figure 3:
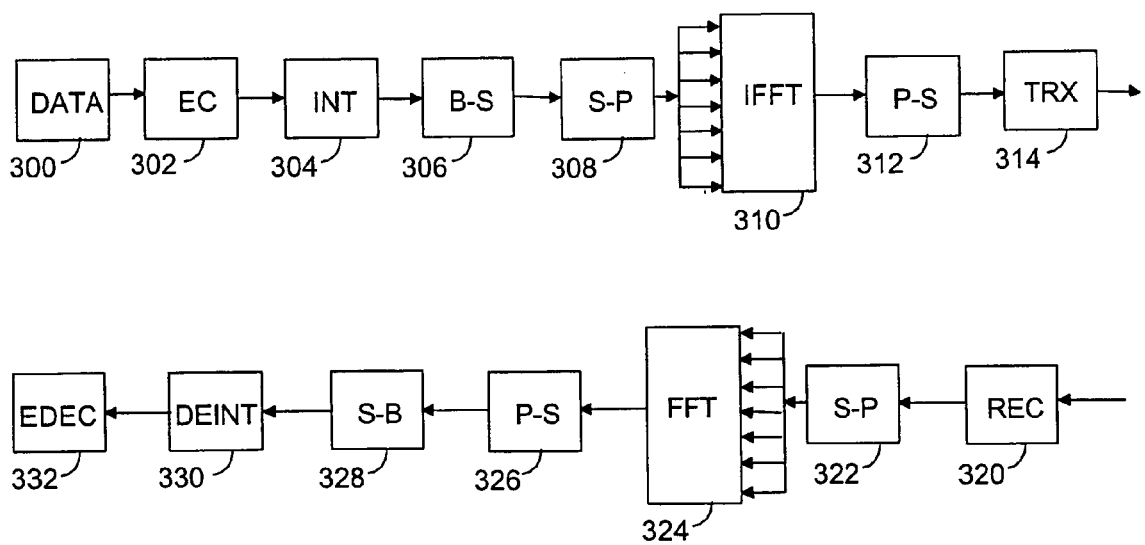
Figure 4:
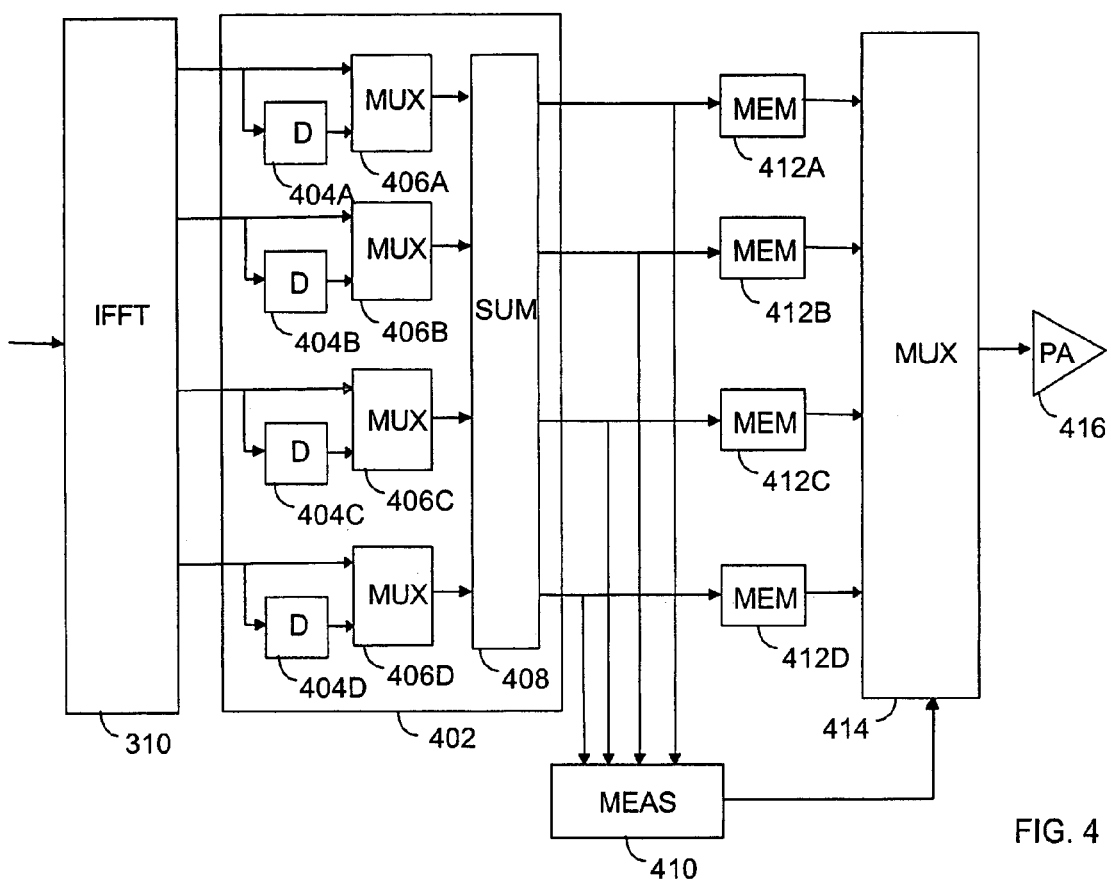
Figure 5:
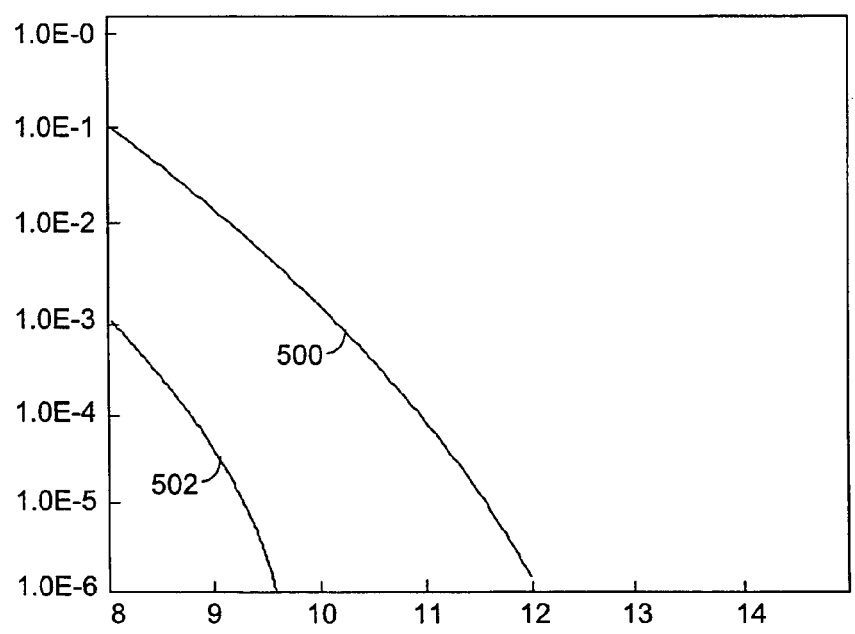

In the following the invention will be described in greater detail by means of the preferred embodiments with reference to the attached drawings, in which FIG. 1 shows an example of the method according to invention, FIG. 2 shows an example of the structure of OFDM transmission, FIG. 3 shows the principles of an OFDM transmitter and receiver, FIG. 4 shows an example of an apparatus according to invention, FIG. 5 illustrates the performance of a method and an arrangement according to the invention.

EMBODIMENTS

FIG. 1 shows an example of the method according to the invention. The method is applicable in an OFDM transmitter, either for a fixed network or a wireless network. In the method, a basic OFDM waveform is created 102 in a transmitter from the modulated data. The principal modulation method used for data modulation can be for instance PSK (Phase Shift Keying) or QAM (Quadrature Amplitude Modulation). The OFDM waveform, that is the basic waveform, is created from the modulated data using IFFT. The basic waveform contains frequency distributed baseband data corresponding to subbands of the OFDM signal. The basic waveform contains several waves where each wave represents a subband signal. The number of waves in the basic waveform is dependent on the parameters given to IFFT transformation. Typically the basic waveform consists of 2-4 waves but can also contain more than four waves.

In method step 104, alternative waveforms are created from a first set of waveform components, that is, the basic waveform. This means that at least one second set of waveform components called alternative waveform is created in addition to the basic waveform. The alternative waveform is created by delaying at least one of the subband components that constitute the basic waveform. The delay used is for instance the sampling interval of one or two samples, the interval referring here to the sampling interval of IFFT transformation. It is clear that the invention is not limited to usage of the delay of one or two sampling intervals, but the delay can also be longer than that. In method step 104 several combinations can be formed of the basic waveform. For example, if there are two alternative delays per subband waveform, zero delay and one-sample delay, the amount of different combinations is 16. If there are 3 alternatives for the delay, that is, no delay, one-sample delay and two-sample delay, the amount of combinations is 81. In this group of 81 waveforms the basic waveform contains all non-delayed components and there are 80 alternative waveforms, where each alternative waveform contains at least one delayed waveform component compared to the components in the basic waveform.

In step 106 the peak-to-average power ratios are measured from the alternative waveforms and the basic waveform. The measurement is performed on the baseband signal and the measurement gives the relation between the peak and the average amplitude levels in the waveforms. The measurement can be performed for example so that the ratio is measured from the duration of one burst where the measurement is based on the training sequence/symbol of the burst and on the data symbols.

One waveform is selected 108 from the waveforms created in step 106. The waveform to be selected can be for instance the waveform with the lowest peak-to-average ratio. The waveform selected in step 110 is transmitted from the OFDM transmitter. Method step 112 shows the reception of the transmitted OFDM signal. In method step 114 any alterations in waveform components of the transmitted waveform are removed. Alterations can be removed from the transmitted signal by utilising training symbols in the transmitted OFDM bursts. Because the procedure presented by the steps 104-110 is also performed to training symbols of OFDM bursts, no changes are needed to the receiver.

The OFDM is often called multi-carrier modulation because it transmits signals over multiple subcarriers simultaneously. That is, in OFDM several narrowband carriers are transmitted from the same source in parallel at different frequencies. Structure of OFDM transmission using time division duplex, TDD, is illustrated in FIG. 2. The invention is not limited to TDD downlink transmission but can also be applied to uplink and FDD (Frequency Division Duplex) transmission. Transmission is divided into frames 200A-200N. Downlink and uplink transmissions are separated into downlink and uplink subframes 202A and 202B, respectively. As an example, the downlink subframe 202A contains synchronization information 204A, frame control header 204B, and bursts 204C-204N. FIG. 3 also shows the structure of a burst 204C. A burst contains synchronization information 206A, a training sequence 206B and one or more data blocks 206C-206N. The training sequence is usually one symbol long and the sequence is used for channel estimation in the receiver, that is, the receiver will use the training sequence to demodulate the data carrying symbols. Usually, in OFDM transmission, data blocks 206C-206N are one symbol long. The training sequence 206B and the data blocks 206C-206N are subjected to OFDM modulation and forming of alternative waveforms.

FIG. 3 illustrates the principles of an OFDM transmitter and receiver. The transmitter is described with reference to blocks 300-312 and the receiver is shown with help of blocks 320-332. In an OFDM transmitter, data 300 to be sent is encoded for error correction in block 302 and interleaved in block 304. Error coding and interleaving assist for example in the interpretation of data that has been sent in transmission situations when part of the data is lost during transmission. In block 306 bit-to-symbol mapping using for instance PSK or QAM modulation is performed. OFDM-multi-carrier systems use a number of low symbol rate subcarriers, the spacing of which selected to be the inverse of the symbol rate duration so that each subcarrier is orthogonal and non-interfering. The spacing performed on subcarrier information is done in block 308, where serial PSK or QAM information is converted to several parallel symbol streams. The parallel symbol streams will be modulated into a number of subcarriers using IFFT in the transforming means 310. In the principal OFDM transmitter, the output waveforms are summed up and serialized in block 312 to form a data stream to be modulated by a single carrier. The created OFDM signal is transmitted using transmission means 314 of the transmitter.

The OFDM receiver contains receiving means 320 for receiving sampled data. Serial data is converted to parallel format in block 322, and frequency domain representation is restored from parallel information streams using FFT (Fast Fourier Transform). Practically, the FFT block 324 performs the task of a number of filters each of which processes a subcarrier. The output of the FFT block 324 is serialized into a single data stream that is deinterleaved and decoded in blocks 330 and 332, respectively. The orthogonal spacing between subcarriers makes it possible for the receiver to separate out each subcarrier.

FIG. 4 shows an example of an apparatus according to the invention. The data to be transmitted is modulated for instance with PSK or QAM modulation. The modulated serial data is received in transformation means 310. The transformation means 310 performs transformation from frequency to time domain by IFFT. The output from the IFFT transformation means 310 is a number of waveforms corresponding to different subbands of the channel. The sum of all the waveforms is the IFFT of the data. The baseband waveform is sent from IFFT to forming means 402, where alternative waveforms of the transformed baseband signal are created. FIG. 4 shows that the forming means 402 creates four alternative waveforms but the invention is not limited to that number of waveforms. Essential to the invention is, that there are at least two waveforms to choose a waveform to be transmitted from.

Forming means 402 in FIG. 4 comprises delaying means 404A-404D and multiplexing means 406A-406D. The signals guided to the multiplexing means 406A are non-delayed and delayed components of the first subband component. The delaying means 404A is configured to delay the first subband waveform by time period of one or two samples. The signals transmitted to the multiplexing means 406B represent the second subband component in the basic waveform. The multiplexing means 406B thus receives a nondelayed waveform from the transforming means 400 and a delayed waveform from the delaying means 404B. The multiplexing means 406C and 406D receive waveforms, which represent the third and the fourth subband components in the basic waveform, respectively. The delay applied to the signal components in the delaying means 404A-404D can be one or two samples, without restricting the invention to these delays. Although FIG. 4 shows one delaying means per multiplexing means, there can be more of them. For instance, there can be a delaying means providing a one-sample delay and another delaying means providing a two-sample delay for the multiplexing means 406A. In the case of one delaying means 404A, the multiplexing means 406A receives the original, undelayed waveform and the delayed waveform and selects one of these as its output. Similarly, the multiplexing means 406B chooses an output between an undelayed waveform and a waveform representing the second subband component, which is delayed by the time of for instance one or two samples.

The summing network means 408 receives as its input the waveforms from the four multiplexing means 406A-406D. The summing network 408 makes waveform combinations by adding delayed and non-delayed waveforms to each other. Each output of the exemplary summing network 408 in FIG. 4 is the sum of four delayed or non-delayed waveforms. With four subband waveforms up to sixteen summed combinations can be formed, out of which only four are shown in FIG. 4. The intention of the summing network is thus to create alternative waveforms, each of which can be received by a trained OFDM receiver.

The waveforms from the summing network means 408 are measured by measuring means 410, which measures the peak-to-average power ratio in the formed alternative baseband waveforms. The outputs of the summing network 408 are also sent to memory means 410A-410C for storage. This is because the signals have to be temporarily stored until the final decision of which signals will be transmitted has been made. When the measuring means 410 has found the lowest peak-to-average power ratio in the signals, this information is communicated to a multiplexer 414 for selection of the waveform to be transmitted. The selected waveform is read from one of the memory means 410A-410C, converted to a radio frequency signal and amplified by the amplifier 416.

In the solution according to the invention, the idea is that the transmitter does not have to signal to the receiver which waveform has been transmitted. Because the training symbol is subject to the same kind of transformation as the data symbols and because the same subbands are delayed, the receiver will be able to extract the transmitted data regardless of which transformation was selected in the transmitter.

FIG. 5 shows the performance of the solution according to the invention. The figure shows the traditional probability function 500 of the PAPR when known methods for OFDM transmission are used and curve 502 presents a probability function of PAPR when the inventive solution is used. It can be seen that when the inventive concept is used, PAPR is clearly reduced and for instance the maximal value of PAPR is 2.5 dB lower than with known solutions. The invention can be implemented in the transmitter for instance by software, in ASIC (Application Specific Integrated Circuit) or as separate logic components.

Even though the invention has above been explained with reference to the examples presented in accompanying drawings, it is obvious that the invention is not restricted thereto but can be modified in various ways within the scope of the inventive idea disclosed in the attached claims.

The invention claimed is:

1. A method of processing an orthogonal frequency-division multiplexing signal, comprising:
    transforming in frequency-to-time transformation data to be transmitted to a basic waveform containing a first set of waveform components representing subbands of a spectrum of the signal, the transformation being done to at least one training symbol and at least one data symbol of an orthogonal frequency-division multiplexing signal burst;
    forming at least one alternative waveform comprising a second set of waveform components, where the second set of waveform components is formed using waveform components in said first set of waveform components of the basic waveform, and where at least one waveform component in the second set of waveform components is delayed a small number of samples in time compared to a corresponding waveform component in the first set of waveform components; and selecting a waveform for transmission from a group of waveforms, where the group of waveforms contains the basic waveform and said at least one alternative waveform, wherein the selection is done from waveforms transformed from the orthogonal frequency-division multiplexing bursts comprising the at least one training symbol and the at least one data symbol.

2. The method according to claim 1, comprising:
measuring a peak-to-average ratio of the waveforms belonging to said group of waveforms, and
selecting a waveform for transmission on the basis of the peak-to-average ratio measurement.

3. The method according to claim 2, wherein the waveform with a lowest peak-to-average ratio is selected for transmission.

4. The method according to claim 2, wherein the peak-to-average ratio measurement is performed on the baseband signal.

5. The method according to claim 2, wherein the orthogonal frequency-division multiplexing signal is transmitted in bursts, where each burst comprises the at least one training symbol and the at least one data symbol.

6. The method according to claim 5, wherein a waveform is selected from the group of waveforms based on the peak-to-average ratio measured over the set of the training symbol and the at least one data symbol.

7. The method according to claim 2, wherein at least one waveform belonging to the group of waveforms is stored in the memory until the peak-to-average ratio has been measured for all waveforms representing a certain period of time.

8. The method according to claim 1, comprising:
transforming the data to be transmitted with an inverse fast fourier transform to the basic waveform;
delaying the component of the basic waveform by one or two inverse fast fourier transform samples in time.

9. The method according to claim 1, comprising:
transforming the data to be transmitted with inverse fast fourier transform to the basic waveform.

10. The method according to claim 1, wherein the method is implemented in a terminal for uplink transmission in a mobile telecommunication system.

11. A method of processing an orthogonal frequency-division multiplexing signal, which orthogonal frequency-division multiplexing signal transmission is performed in bursts, and where each burst comprises at least one training symbol and at least one data symbol, the method comprising:
transforming in frequency-to-time transformation data to be transmitted to a basic waveform containing waveform components representing subbands of a spectrum of the orthogonal frequency-division multiplexing signal;
forming at least one alternative waveform comprising a second set of waveform components, where the second set of waveform components is formed using waveform components in said first set of waveform components of the basic waveform, and where at least one waveform component in the second set of waveform components is delayed a small number of samples in time compared to a corresponding waveform component in the first set of waveform components;
selecting a waveform for transmission from a group of waveforms, where the group contains the basic waveform and the at least one alternative waveform;
transmitting the orthogonal frequency-division multiplexing signal containing the selected waveform;
receiving the transmitted orthogonal frequency-division multiplexing signal in a receiver; and
removing in the receiver alterations in waveform components in the received orthogonal frequency-division multiplexing signal compared with the transmitted orthogonal frequency-division multiplexing signal with the aid of said at least one training symbol.

12. The method according to claim 11, further comprising:
measuring a peak-to-average ratio of the waveforms belonging to said group of waveforms; and
selecting the waveform for transmission on the basis of the peak-to-average ratio measurement.

13. The method according to claim 11, wherein the waveform with a lowest peak-to-average ratio is selected for transmission.

14. The method according to claim 11, wherein a peak-to-average power ratio measurement is performed on a baseband signal.

15. The method according to claim 11, wherein a waveform is selected from the group of waveforms based on a peak-to-average ratio measured over the at least one training symbol and the at least one data symbol.

16. The method according to claim 11, further comprising:
storing at least one waveform belonging to the group of waveforms in a memory until the peak-to-average ratio has been measured for all waveforms representing a certain period of time.

17. The method according to claim 11, further comprising:
transforming the data to be transmitted with an inverse fast fourier transform to the basic waveform; and
delaying the component of the basic waveform by one or two inverse fast fourier transform samples in time.

18. The method according to claim 11, further comprising:
transforming the data to be transmitted with an inverse fast fourier transform to the basic waveform.

19. The method according to claim 11, wherein the transmission is implemented in a terminal for uplink transmission in a mobile telecommunication system and the reception is implemented in a base station in a mobile telecommunication system.

20. An apparatus, comprising:
a transforming unit configured to transform data to be transmitted in frequency-to-time transformation to a basic waveform containing waveform components representing subbands of a spectrum of the signal, the transforming unit being configured to transform orthogonal frequency-division multiplexing signal bursts, each comprising at least one training symbol and at least one data symbol;
a forming configured to form at least one alternative waveform comprising a second set of waveform components, where the second set of waveform components is formed using waveform components in said first set of waveform components of the basic waveform, and where at least one waveform component in the second set of waveform components is delayed a small number of samples in time compared to a corresponding waveform component in the first set of waveform components; and a selecting unit configured to select a waveform for transmission from a group of waveforms, containing the basic waveform and the at least one alternative waveform, which waveforms have been transformed over the set of the at least one training symbol and the at least one data symbol of an orthogonal frequency-division multiplexing burst.

21. The apparatus according to claim 20, further comprising:

a measuring unit configured to measure a peak-to-average ratio of the waveforms belonging to said group of waveforms, and said selecting unit is configured to select a waveform for transmission on the basis of the peak-to-average ratio measurement.

22. The apparatus according to claim 21, wherein the selecting unit is configured to select the waveform with a lowest peak-to-average ratio for transmission.

23. The apparatus according to claim 21, wherein the measuring unit is configured to measure the peak-to-average ratio in a baseband signal.

24. The apparatus according to claim 21, wherein the orthogonal frequency-division multiplexing transmission is performed in bursts, wherein each orthogonal frequency-division multiplexing burst comprises the at least one training symbol and the at least one data symbol, and the selecting unit is configured to select a waveform from the group of waveforms based on the peak-to-average ratio measured over the set of the training symbol and the at least one data symbol.

25. The apparatus according to claim 21, further comprising:

a memory configured to store at least one waveform belonging to a group of waveforms until the peak-to-average ratio has been measured for all waveforms representing a certain period of time.

26. The apparatus according to claim 20, wherein the transforming unit is configured to transform the data to be transmitted with an inverse fast fourier transform to the basic waveform, and the forming unit is configured to delay the component of the basic waveform by one or two inverse fast fourier transform samples in time.

27. The apparatus according to claim 20, wherein the transforming unit is configured to transform the transmitted with an inverse fast fourier transform to the basic waveform.

28. The apparatus according to claim 20, wherein the apparatus is a terminal in a mobile telecommunication system.

29. An orthogonal frequency-division multiplexing signal processing arrangement, comprising:

a transmitter configured to transmit an orthogonal frequency-division multiplexing signal, which orthogonal frequency-division multiplexing transmission is performed in bursts, where each burst comprises at least one training symbol and at least one data symbol; and a receiver configured to receive the transmitted orthogonal frequency-division multiplexing signal, wherein the transmitter comprises a transforming unit configured to transform data to be transmitted in frequency-to-time transformation to a basic waveform containing waveform components representing subbands of a spectrum of the orthogonal frequency-division multiplexing signal, a forming unit configured to form at least one alternative waveform comprising a second set of waveform components, where the second set of waveform components is formed using waveform components in said first set of waveform components of the basic waveform, and where at least one waveform component in the second set of waveform components is delayed a small number of samples in time compared to a corresponding waveform component in the first set of waveform components, a selecting unit configured to select a waveform for transmission from a group of waveforms, where the group contains the basic waveform and the at least one alternative waveform, and a transmitting unit configured to transmit the orthogonal frequency-division multiplexing signal containing the selected waveform, and the receiver comprises a receiving unit configured to receive the transmitted orthogonal frequency-division multiplexing signal; and a removing unit configured to remove in the receiver alterations in waveform components in the received orthogonal frequency-division multiplexing signal compared with the transmitted orthogonal frequency-division multiplexing signal with the aid of said at least one training symbol.

30. The arrangement according to claim 29, wherein the transmitter further comprises a measuring unit configured to measure a peak-to-average ratio of the waveforms belonging to said group of waveforms, wherein said selecting unit is configured to select a waveform for transmission on the basis of the peak-to-average ratio measurement.

31. The arrangement according to claim 30, wherein the selecting unit is configured to select the waveform with a lowest peak-to-average ratio for transmission.

32. The arrangement according to claim 30, wherein the measuring unit is configured to measure the peak-to-average ratio in a baseband signal.

33. The arrangement according to claim 30, wherein the selecting unit is configured to select a waveform from the group of waveforms based on the peak-to-average ratio measured over the set of the training symbol and the at least one data symbol.

34. The arrangement according to claim 30, further comprising:

a memory configured to store at least one waveform belonging to a group of waveforms until the peak-to-average ratio has been measured for all waveforms representing a certain period of time.

35. The arrangement according to claim 29, wherein the transforming unit is configured to transform the data to be transmitted with an inverse fast fourier transform to the basic waveform, and the forming unit is configured to delay the component of the basic waveform by one or two inverse fast fourier transform samples in time.

36. The arrangement according to claim 29, wherein the transforming unit is configured to transform the transmitted with an inverse fast fourier transform to the basic waveform.

37. The arrangement according to claim 29, wherein the transmitter is a terminal in a mobile telecommunication system and the transmitter is a base station in a mobile telecommunication system.

38. An apparatus, comprising:

means for transforming data to be transmitted in frequency-to-time transformation to a basic waveform containing waveform components representing subbands of a spectrum of the signal, the transforming means being configured to transform orthogonal frequency-division multiplexing signal bursts, each comprising at least one training symbol and at least one data symbol;

means for forming at least one alternative waveform comprising a second set of waveform components, where the second set of waveform components is formed using waveform components in said first set of waveform components of the basic waveform, and where at least one waveform component in the second set of waveform components is delayed a small number of samples in time compared to a corresponding waveform component in the first set of waveform components; and means for selecting a waveform for transmission from a group of waveforms, containing the basic waveform and the at least one alternative waveform, which waveforms have been transformed over the set of the at least one training symbol and the at least one data symbol of an orthogonal frequency-division multiplexing burst.

39. An orthogonal frequency-division multiplexing signal processing arrangement, comprising:

transmitter means for transmitting an orthogonal frequency-division multiplexing signal, which orthogonal frequency-division multiplexing transmission is performed in bursts, where each burst comprises at least one training symbol and at least one data symbol; and receiver means for receiving the transmitted orthogonal frequency-division multiplexing signal, wherein the transmitter means comprises means for transforming data to be transmitted in frequency-to-time transformation to a basic waveform containing waveform components representing subbands of a spectrum of the orthogonal frequency-division multiplexing signal, means for forming at least one alternative waveform comprising a second set of waveform components, where the second set of waveform components is formed using waveform components in said first set of waveform components of the basic waveform, and where at least one waveform component in the second set of waveform components is delayed a small number of samples in time compared to a corresponding waveform component in the first set of waveform components, means for selecting a waveform for transmission from a group of waveforms, where the group contains the basic waveform and the at least one alternative waveform, and means for transmitting the orthogonal frequency-division multiplexing signal containing the selected waveform, and the receiver means comprises means for receiving the transmitted orthogonal frequency-division multiplexing signal; and means for removing in the receiver alterations in waveform components in the received orthogonal frequency-division multiplexing signal compared with the transmitted orthogonal frequency-division multiplexing signal with the aid of said at least one training symbol.

* * * * *